Figure 1:
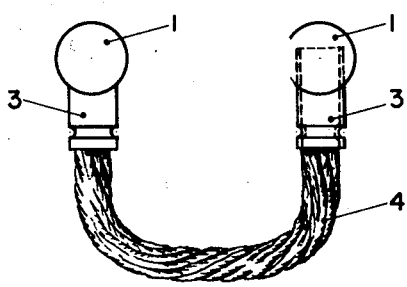

July 22, 1952  K. J. AVERSTEN  2,604,570

ELECTRIC CONNECTION AND METHOD FOR PRODUCING THE SAME

Filed Jan. 6, 1950

INVENTOR
K.J. Aversten
BY
Robert B Larson
ATTORNEY

Patented July 22, 1952

2,604,570

UNITED STATES PATENT OFFICE 2,604,570

ELECTRIC CONNECTION AND METHOD FOR PRODUCING THE SAME

Karl Joel Aversten, Lidingo, Sweden, assignor to Svenska Aktiebolaget Gasaccumulator, Lidingo, Sweden, a corporation of Sweden Application January 6, 1950, Serial No. 137,140
In Sweden January 10, 1949

11 Claims. (Cl. 219—12)

The present invention refers to electric connections for connecting a pair of rails so as to provide good contact therebetween. Such connections or bonds, are conventionally formed by a cable or wire comprising a plurality of twisted copper strands and of a pair of contact shoes each attached to a corresponding end of the wire. The contact shoes are further attached in some way to the rail, e. g. mechanically, by soldering or by manual welding with the application of a particular welding material, which thus forms the binding agency between the contact shoe and the rail.

According to the present invention the connection is formed by placing each contact shoe in a socket connected to a source of electric energy and pressing it by means of the socket against the rail simultaneously with the application of electric current, which flows through the contact shoe to the rail thus at once welding the contact shoe over substantially the entire surface thereof that contacts the rail, the electric connectors being attached to the contact shoes before or after the welding operation. This enables the connection to be made appreciably quicker than with the methods hitherto used and the good quality of the connection is not dependent upon the skill of the operator. For the usual manual welding or soldering of the contact shoe, on the other hand, long training is necessary and also continued and detailed supervision of the work of the welder in order to ensure good quality in the completed connections. Another disadvantage with the known methods referred to is that there is applied inevitably so much heat to the copper wire that the material thereof recrystallizes and becomes brittle within a zone some distance away from the connecting point between the copper wire and the corresponding contact shoe. During the perpetual vertical relative movements of the rail ends when the wheels of trains pass over them, the copper wire gradually becomes fatigued within this zone and then breaks, so that the electrical connection is nullified. In the method according to the present invention the applied quantity of heat is so unappreciable that no structural deterioration of the wire material can occur.

In comparison with mechanical connections the present invention provides the advantage of a more durable and electrically reliable connection. Mechanical joints loosen in the course of time under the influence of rail movements, temperature variations or the like, and the electrical conductance goes down on account of oxidation of or impurities formed on the contact surfaces.

Figure 2:
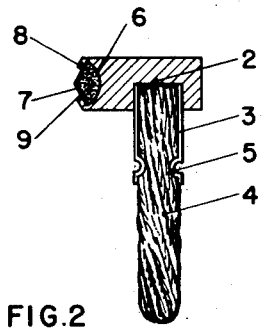
Figure 3:
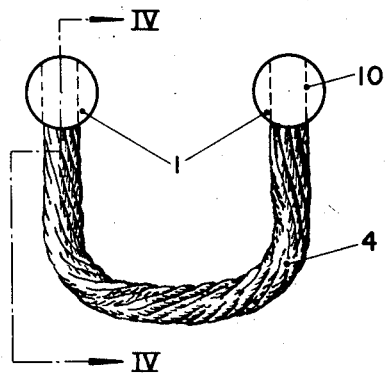
Figure 4:
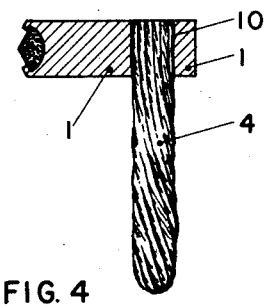
Figure 5:
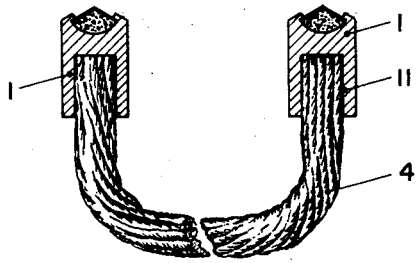
Figure 6:
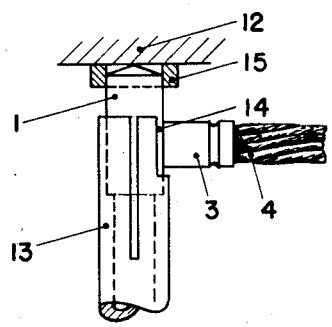

The invention is illustrated in some of its embodiments on the attached drawing, in which Fig. 1 is a view of a connection according to the invention, Fig. 2 a vertical section thereof, Fig. 3 a vertical view of a modification, Fig. 4 a section taken on the line IV of Fig. 3 and Fig. 5 a further modification in longitudinal section. Fig. 6 shows the welding of a contact shoe.

In the Figs. 1 and 2 modification the contact shoes are in the form of iron rods but they may also consist of some other metal, such as copper. Approximately at right angles to the longitudinal direction of the contact shoe there is a notch, in which a short copper tube 3 is attached by soldering. The ends of a copper wire 4 are placed each in one of the tubes 3 and attached by soldering thereto. Further, the outermost ends of the tubes 3 are provided with grooves 5 causing the strands of the wire to be pressed firmly together at this point and thereby preventing movements of the strands from propagating beyond the compressed portion and into the tubes 3. The wire 4 obviously does not have to be a copper wire. Steel would also be possible, if its lower conductivity would be satisfactory, as well as aluminium.

One end of the contact shoe has a recess 6 covered by a conical lid 7 attached by means of a thin annular rim 8 formed on the contact shoe and overlying the edge of the lid 7 thus forming a chamber, which is adapted to contain a pulverous welding composition 9. This composition is essentially for the same purpose as the external layer of ordinary welding electrodes, namely to facilitate the striking of the welding arc and to stabilize the arcs formed between the workpiece and the end of the contact shoe. It also serves as a welding composition and protects against oxidation, and possibly also serves as a heat generating medium.

Obviously the tube 3 is not absolutely required, but the ends of the wires may also be soldered direct to the contact shoes as indicated in Figs. 3 and 4. Each contact shoe then has a bore 10 extending through it and into which an end of the wire is inserted and is then attached by soldering. In such an arrangement the wire is subjected to bending immediately adjacent the point of attachment to the contact shoe. This however is probably of minor importance when the bore 10 extends through the whole length of the shoe, thus providing for a large effective soldering area between wire and shoe. The connections described with reference to Figs. 1–4 are to be positioned at the side of the railhead, so that the longitudinal direction of the contact shoes will be essentially horizontal and the wire will be approximately in a vertical plane. Sometimes, especially if wires of greater length are used, it is preferable to attach the contact shoes to the lower surface of the rail head. In such case the Fig. 5 embodiment is the most suitable. Each contact shoe 1 has a bore 11 extending from one end of the shoe in the longitudinal direction thereof and having inserted into it and attached by soldering thereto the wire end.

For attachment to the web or flange portion of the rail any one of the described contact shoes or further modifications thereof may be used.

The welding of the contact shoes to the end of the rails is performed in a way which will be further explained in connection with Fig. 6. There is shown a contact shoe 1 of the Fig. 1 type adapted to be welded to a rail head indicated by 12. The contact shoe is surrounded by a partially shown holder 13. The portion of the holder surrounding the contact shoe forms a slotted, resilient sleeve having a side notch 14 accommodating the tube 3. The holder 13 is connected to a source of electrical energy. Preferably, the holder has the shape of a pistol, as is known per se, the portion shown in Fig. 6 corresponding to the barrel and the contact shoe being comparable in position with a bullet just leaving the muzzle. The trigger of the pistol cooperates with an interior control switch adapted to switch on and off the welding current. The welding time is controlled by a timing device, preferably disposed in a separate box or rack and connected with the pistol. The end of the contact shoe 1 is loosely inserted into a ring of fire resistant porcelain or the like which serves as a mould for the melted substances occurring at the welding point. When a welding operation has been completed the ring 15 can easily be knocked off.

The amount of applied energy according to this method is very small so that the conduction of heat away from the welding point occurs very rapidly. This may bring about appreciable hardening effects within the area between the weld and the unaffected rail metal. For these reasons it may be advisable, particularly if the rail metal is of a high coal content, to heat the welding area in order to decrease the cooling rate and thereby the magnitude of the hardening effect.

The wire 4 with or without the tube 3 may be joined to the contact shoes before the welding of the latter to the rails, but it is also possible first to weld the contact shoes to it, possibly even before transportation of the rail to the construction site or before laying it down on the track, and thereafter to attach the wire. If the ends of the rails have been preheated the applied heat may suitably be utilized to complete the welding together of the wire and the contact shoe. The wire as well as the contact shoe should then previously have been treated with flux material and solder so that the only operation to be performed is to insert the wire into the contact shoe, whereupon soldering will automatically take place. It would also be feasible to attach the wire to the contact shoe afterwards by means of a screw, wedge or rivet type joint.

In the described embodiments arc welding was used for attaching the contact shoes to the ends of the rails, but it would also be possible to use resistance welding. In that case the pistol must apply a greater pressure on the contact shoe against the workpiece and the amount of energy applied will be greater. However, the elements 6—9 are then simplified insofar as the end face of the contact shoe does not have to accommodate a flux medium. Nor is it absolutely necessary in arc welding to adapt the contact shoe for carrying the flux, but the end adjoining the rail may simply form a solid conical tip. Further, the holder could be adapted to join both of the contact shoes that make up a bond simultaneously to the rails. Various fluxes, such as solid, briquetted or liquid ones, may be housed in the contact shoe. Further modifications of the invention are possible within the scope of the appended claims.

What is claimed is:

1. In a method of electrically connecting or bonding a pair of rails by means of a pair of contact shoes to be attached to said rails and to be mutually connected by a conductor, the steps of inserting a contact shoe into a holder connected with a source of electrical energy, pressing one end of said holder against one of said rails so as to make the end of said contact shoe abut against said rail while applying energy from said source through said contact shoe to said rail so as to join in one welding operation substantially all of said end to said rail.

2. In a method as claimed in claim 1, the steps of preheating said rail prior to said welding operation, of applying solder to said end of said conductor and inserting said end into said contact shoe, and of utilizing the heat developed in said preheating process for soldering said end to said contact shoe.

3. In a method as claimed in claim 1, the steps of soldering a tubular end cap on to said end of said conductor, of soldering said cap to said contact shoe and of compressing a portion of said cap outside said contact shoe.

4. In a method as claimed in claim 1, the use of a contact shoe of approximately cylindrical shape, an end of which is adapted to be welded to said rail, and the steps of forming in said contact shoe a bore extending therethrough at the end thereof distant from said rail, and of inserting said conductor into said bore and soldering it thereto.

5. In a method as claimed in claim 1, the use of a contact shoe of approximately cylindrical shape, one end of which is adapted to be welded to said rail, the steps of forming an axial bore in the other end of said contact shoe, and of inserting said conductor into said bore and soldering it thereto.

6. A connection as claimed in claim 10, in which the outer end of said tubular cap comprises a compressed portion.

7. A modified connection substantially as claimed in claim 11, in which said bore extends through said contact shoe, said conductor being attached directly by soldering therein.

8. A connection as claimed in claim 11, in which said contact shoe has, in the end thereof opposite the end adapted to be welded to said rail, an axial bore, an end of said conductor being attached in said bore.

9. An electrical connection according to claim 10 in which said holder comprises a resilient slotted sleeve having a side notch adapted to accommodate said conductor.

10. An electrical connection comprising a contact shoe having a transverse bore in one end thereof, a tubular member soldered into said bore surface, and a conductor soldered into said tubular member, said contact shoe being adapted, at the end having the bore, for insertion into a holder connected to a source of electric energy, and for welding to a rail at the end remote from the bore by application of electric energy through said contact shoe.

11. In apparatus for making an electrical connection to a rail, the combination of a conductor, a contact shoe attached to an end of said conductor, and a holder into which said contact shoe is inserted, said holder being connected to a source of electric energy for welding one end of said contact shoe to said rail by application of electric energy through said contact shoe.

KARL JOEL AVERSTEN.

REFERENCES CITED

The following references are of record in the file of this patent:

UNITED STATES PATENTS

| Number | Name | Date |
| --- | --- | --- |
| 1,310,411 | Crecelius | July 22, 1919 |
| 1,341,337 | Mead | May 25, 1920 |
| 1,554,285 | Larson | Sept. 22, 1925 |
| 2,455,244 | Evans | Nov. 30, 1948 |
| 2,459,957 | Palmer | Jan. 25, 1949 |
| 2,474,531 | Keir et al. | June 28, 1949 |